United States Patent
Moebus et al.

(10) Patent No.: US 9,328,177 B2
(45) Date of Patent: May 3, 2016

(54) METHODS FOR PROCESSING AND INTERPRETING SIGNALS FROM STATIC AND ACOUSTIC PROBES IN FLUIDIZED BED REACTOR SYSTEMS

(71) Applicant: ExxonMobil Research and Engineering Company, Annandale, NJ (US)

(72) Inventors: Joseph Andres Moebus, Houston, TX (US); William Anthony Lamberti, Stewartsville, NJ (US); Harry William Deckman, Clinton, NJ (US); Charles R. Buhler, Cocoa Beach, FL (US); Judson Sidney Clements, Boone, NC (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 91 days.

(21) Appl. No.: 14/141,857

(22) Filed: Dec. 27, 2013

(65) Prior Publication Data

US 2014/0194582 A1    Jul. 10, 2014

Related U.S. Application Data

(60) Provisional application No. 61/746,640, filed on Dec. 28, 2012.

(51) Int. Cl.
*C08F 2/00* (2006.01)
*C08F 2/38* (2006.01)
(Continued)

(52) U.S. Cl.
CPC . *C08F 2/01* (2013.01); *C08F 2/002* (2013.01); *C08F 2/34* (2013.01)

(58) Field of Classification Search
CPC ............... C08F 2/002; C08F 2/34; C08F 2/01
USPC .................... 526/59, 60, 61, 67, 82
See application file for complete search history.

(56) References Cited

U.S. PATENT DOCUMENTS

| 6,008,662 A | 12/1999 | Newton et al. |
| 6,660,812 B2 | 12/2003 | Kuechler et al. |

(Continued)

FOREIGN PATENT DOCUMENTS

| EP | 0970970 B1 | 12/2003 |
| EP | 1623999 A1 | 2/2006 |

(Continued)

OTHER PUBLICATIONS

The International Search Report and Written Opinion of PCT/US2013/077974 dated Jul. 10, 2014.

*Primary Examiner* — William Cheung
(74) *Attorney, Agent, or Firm* — Robert A. Migliorini (57) ABSTRACT

Provided is a method for operating a gas-phase, fluidized-bed reactor. The method has the steps of (a) receiving a signal from a probe in contact with the interior of the reactor or a process component in communication with the reactor, wherein the signal is derived from a physical property or condition within the reactor or the process component; (b) modifying the signal to create a modified signal; and (c) adjusting one or more operating parameters of the reactor in response to the modified signal if the physical property or condition is different than a desired value. There is also a method for reducing fouling in a distributor plate of a gas-phase, fluidized-bed reactor with a recycle line.

38 Claims, 6 Drawing Sheets

(51) Int. Cl.
*C08F 2/01* (2006.01)
*C08F 2/34* (2006.01)

(56) References Cited

U.S. PATENT DOCUMENTS

| | | |
|---|---|---|
| 6,831,140 B2 | 12/2004 | Muhle et al. |
| 6,905,654 B2 | 6/2005 | Bartilucci et al. |
| 7,799,876 B2 | 9/2010 | Markel et al. |
| 2007/0244271 A1* | 10/2007 | Muhle et al. .................. 526/60 |
| 2010/0286346 A1 | 11/2010 | Muhle et al. |

FOREIGN PATENT DOCUMENTS

| | | |
|---|---|---|
| EP | 2263993 A2 | 2/2006 |
| EP | 0784637 B2 | 3/2008 |
| WO | 98/12231 A1 | 3/1998 |
| WO | 0206188 A2 | 1/2002 |
| WO | 2004060940 A1 | 7/2004 |
| WO | 2005113615 A2 | 12/2005 |
| WO | 200816478 A2 | 2/2008 |
| WO | 2008100368 A1 | 8/2008 |
| WO | WO 2008/100368 A1 * | 8/2008 |
| WO | 2009014682 A2 | 1/2009 |
| WO | 2010129634 A1 | 11/2010 |

* cited by examiner

METHODS FOR PROCESSING AND INTERPRETING SIGNALS FROM STATIC AND ACOUSTIC PROBES IN FLUIDIZED BED REACTOR SYSTEMS

CROSS REFERENCE TO RELATED APPLICATIONS

This application claims priority to U.S. Provisional Application Ser. No. 61/746,640 filed Dec. 28, 2012, herein incorporated by reference in its entirety.

FIELD

The disclosure relates to a method for operating a gas-phase, fluidized-bed reactor. The disclosure further relates to a method for reducing fouling in a distributor plate of a gas-phase, fluidized-bed reactor.

BACKGROUND

Fouling in commercial fluidized bed reactors, including gas phase polymerization reactors, is a significant operational issue. Fouling negatively impact operational efficiency and ultimately requires time-consuming shutdown and maintenance.

Understanding the causal factors of fouling within the reactor systems would be beneficial in reducing fouling. Fouling in fluidized bed reactors can be strongly affected by physical processes within the fluidized bed reactor, such as electrostatic charge and solids carryover within a recycle loop.

Commercial probes, including those commonly referred to as static probes and acoustic probes, exist for measuring certain physical parameters within fluidized bed reactors, such as electrostatic charge and solids flow. In common practice, however, these probes do not reliably directly measure these phenomena, and are instead dominated by noise and/or artifacts in the signals. Thus, probe signals have proven to be of limited or no value in monitoring the operational status of or diagnosing inefficiencies in fluidized bed reactors.

It would be desirable to have new methods for processing and interpreting probe signals in fluidized bed reactor systems. It would further be desirable to have new methods that provide for more efficient system operation and reliability.

SUMMARY

According to the present disclosure, there is a method for operating a gas-phase, fluidized-bed reactor. The method has the steps of (a) receiving a signal from a probe in contact with the interior of the reactor or a process component in communication with the reactor, wherein the signal is derived from a physical property or condition within the reactor or the process component; (b) modifying the signal to create a modified signal; and (c) adjusting one or more operating parameters of the reactor in response to the modified signal if the physical property or condition is different than a desired value.

Further according to the present disclosure, there is a method for reducing fouling in a distributor plate of a gas-phase, fluidized-bed reactor with a recycle line. The method has the steps of (a) receiving a signal from a probe in contact with the interior of the reactor or the recycle line in communication with the reactor, wherein the signal is derived from a physical property or condition within the reactor or the recycle line; (b) modifying the signal to create a modified signal; and (c) adjusting one or more operating parameters of the reactor in response to the modified signal if the physical property or condition is different than a desired value.

Further according to the present disclosure, there is a method for operating a gas-phase, fluidized-bed reactor system. The method has the step of cross-correlating between the signal of one or more acoustic probes and the signal of one or more static probes in a recycle line of a reactor to determine velocity and amount of entrained particles.

Further according to the present disclosure, there is a method for operating a gas-phase, fluidized-bed reactor system. The method has the step of auto-correlating between or determining the difference between the signals of two or more static probes in the reactor system to determine local average resin charge state therein.

Further according to the present disclosure, there is a method for operating a gas-phase, fluidized-bed reactor system. The method has the step of auto-correlating between or determining the difference between the signals of two or more static probes in the reactor system to determine the electric field therein.

Further according to the present disclosure, there is a method for operating a gas-phase, fluidized-bed reactor system. The method has the step of using one or more static probes to measure charge on a resin in a fluidized-bed of a reactor in the reactor system. Resin is defined throughout this document to mean any particle, including those partially or wholly composed of polyethylene, ceramic, catalyst, Exceed Polyethylene, Enable Polyethylene, or Exact Polyethylene, or any other material. These particles can be electrically conductive or non-conductive. These particles may or may not contain varying levels of soluble components such as hydrocarbons.

Further according to the present disclosure, there is a method for operating a gas-phase, fluidized-bed reactor system. The method has the step of measuring direct current from a signal from one or more static probes to determine tribocharging components of the signal.

Further according to the present disclosure, there is a method for operating a gas-phase, fluidized-bed reactor system. The method has the step of cross-correlating between the signal of one or more acoustic probes and the signal of one or more static probes in a recycle line of a reactor to determine velocity and amount of entrained particles.

DETAILED DESCRIPTION

All numerical values within the detailed description and the claims herein are modified by "about" or "approximately" the indicated value, and take into account experimental error and variations that would be expected by a person having ordinary skill in the art.

In the methods of the disclosure, multiple signal processing and data interpretation techniques, as applied to signals obtained from probes, reveal information the physics (i.e., electrostatics and solids transfer) within an operating fluidized bed reactor. These techniques, when applied to conventional or modified static probes, can elucidate the electrostatic charge on particles within a fluidized bed or carryover stream. Additional techniques, when applied to acoustic sensors, can elucidate the rate of solids transfer, flow, and carryover rate in the fluidized system. These techniques, when combined, with or without additional sensor information from the reactor (i.e., valve timings, pressure, gas compositions, etc.), can provide unique information the overall performance and operational status of a fluidized bed reactor system. This information, in turn, affords enhancements in operability and reduction in fouling.

Mathematical techniques can be applied to static and/or acoustic probe data to obtain a variety of useful indicators for reactor conditions. Useful techniques include Fourier analysis, digital filtering of high-speed static probe data (i.e., data sampling rates faster than 10 Hz; 100 Hz is typical), integrations, baseline shifts, time-resolved means and inverse means, time-resolved variances, auto-correlations, cross-correlations, and direct correlations with other sensor information.

Static Probes:

Static probes measure current. Sources of current can be direct tribo-charging due to particle impact or induced current arising from fluctuations in the electric field. Bare metal static probes signals can be dominated by triboelectric charge transfer via particle collisions, which affects mean and integral values of the static probe signal. Surface-altered static probes have a dielectric coating made from an electrostatically insulating material applied to the sensing tip that mitigates the triboelectric charge transfer. For the coating to be an effective mitigation technique, the coating must reach a state of charge saturation in which further charge transfer is reduced, on average, to an insignificant level. This mitigates direct triboelectric charging. The amount of time the coating takes to reach the charge-saturated state is dependent on the material the coating is made of and the charge transfer rate of the impinging particles. Mitigation of the triboelectric charge transfer and charge injection allows for accurate measurement of the mean and variance of the resultant static probe signal.

The use of static probes in fluidized bed reactor systems is disclosed by way of example in U.S. Pat. Nos. 6,831,140 B2; 7,799,876 B2; WO 2004/060940; and WO 2009/014682 A2, all of which are incorporated by reference herein in their entireties.

Electrostatic charge can be bulk, individual, or refer to sign of particles passing near tip of probe.

A preferred static probe is coated with a dielectric. The surface properties of the probe can be configured to measure specific physical and chemical processes. The coated probe substantially reduces noise and/or artifacts in signals transmitted. The coated probe essentially takes the form of a metal rod with a modified surface. The probe can be configured to measure, among other things, electrostatic charge, changing or fluctuating electric field, bubbles in charged fluid beds, and detection of transient surface active species (gas, liquid, or solid) not normally present, or desired, in a given system (i.e., contaminants in a system).

In this embodiment, a static probe can be coated with an electrically insulating composition to mitigate triboelectrification of the probe arising from charge transfer from impinging particulates and therefore mitigate extraneous signals via charge saturation of the coating. Conventional measurement methods are not viable when particles impact an uncoated sensing element because of the resultant signal altering charge transfer due to the impacts.

In another embodiment, a static probe can be coated to measure the ambient DC (direct current) electric field by periodically blocking the field near the probe while also substantially preventing particle-to-surface interactions via purging of the sensing element with a flowing gas. Since a conventional probe can only measure a change in induced signal, the probe does not have the ability to measure a DC or constant field as they do not create a change in induced charge at the probe tip (the derivative of a constant field is zero, therefore no change. By alternately blocking the electric field from reaching the probe's sensing element and then removing the block, a changing electric field is created. Then a change in induced charge at the probe tip can be observed and calibrated to a known field strength. Accurately measuring the DC field is possible if particle impacts and unwanted charge transfer with the probe are prevented, such as purging with a flowing gas stream.

Without being bound by any particular theory, it is believed that in configuring a coated static probe, three material properties are important in optimizing the ability of a dielectric material to maintain a saturation charge. The properties are the following:

(1) Dielectric strength—determines the maximum electric field at which the material reaches electrical breakdown (also known as dielectric breakdown voltage).

(2) Surface and volume resistivity—determine the rate at which a material will charge or discharge analogous to an RC circuit. Surface resistivity describes the amount of conduction across the surface, while volume resistivity describes the amount of conduction through the material. Typical values of resistivity are the following: Conductive<$10^4$, $10^4$>Dissipative<$10^{11}$, Insulating≥$10^{11}$ (ANSI-ESD Surface Units: Ω; ANSI-ESD Volume Units: Ω-cm).

(3) Placement within triboelectric series—affects the amount and polarity of charge transferred due to contact and separation. Ideally no charge would transfer between two objects of the exactly the same material, although in practice some transfer usually occurs.

To optimize the dielectric material for maintaining a saturation charge layer and inhibiting tribocharging, the dielectric strength, surface and volume resistivity should all be optimized. Another factor can in some cases be relative placement within the triboelectric series. Importantly, the ideal dielectric material should be of high dielectric strength, and high volume resistivity. It is also desirable for the coating to be similarly placed within the triboelectric series as the material that would collide with it. The dielectric strength should be high enough so the material doesn't breakdown as the charge builds up. Surface and volume resistivity should be in the insulating range so that the charge builds up and does not decay too quickly.

Useful coating materials include, for example, polyethylene.

Coating of static probes can be carried out by any means known in the art. One method is to heat the static probe with a heat gun then submerge it into a bed of polymer particles with suitable melting point and adhesive properties (if desired, the probe can be heated with an oven to ensure uniform heating). The particles then stick to the probe. With the particles in place, they can then be heated to the point where they begin to "flow" using the heat gun. Once the particles have formed a uniform coating, the heat source is removed so the coating can harden. This process is commonly called a dip coating. Other known dip coating methods may also be used.

Acoustic Probes:

Acoustic probes measure energy transfer due to collisions and/or vibration. Ideal data acquisition for these probes would be high speed (>20 kHz) to allow for Fourier analysis to determine particle flux. The signal from these probes can be dominated by mechanical noise and tube waves. It would be desirable to have methods for filtering out such noise and waves.

Figure 9:
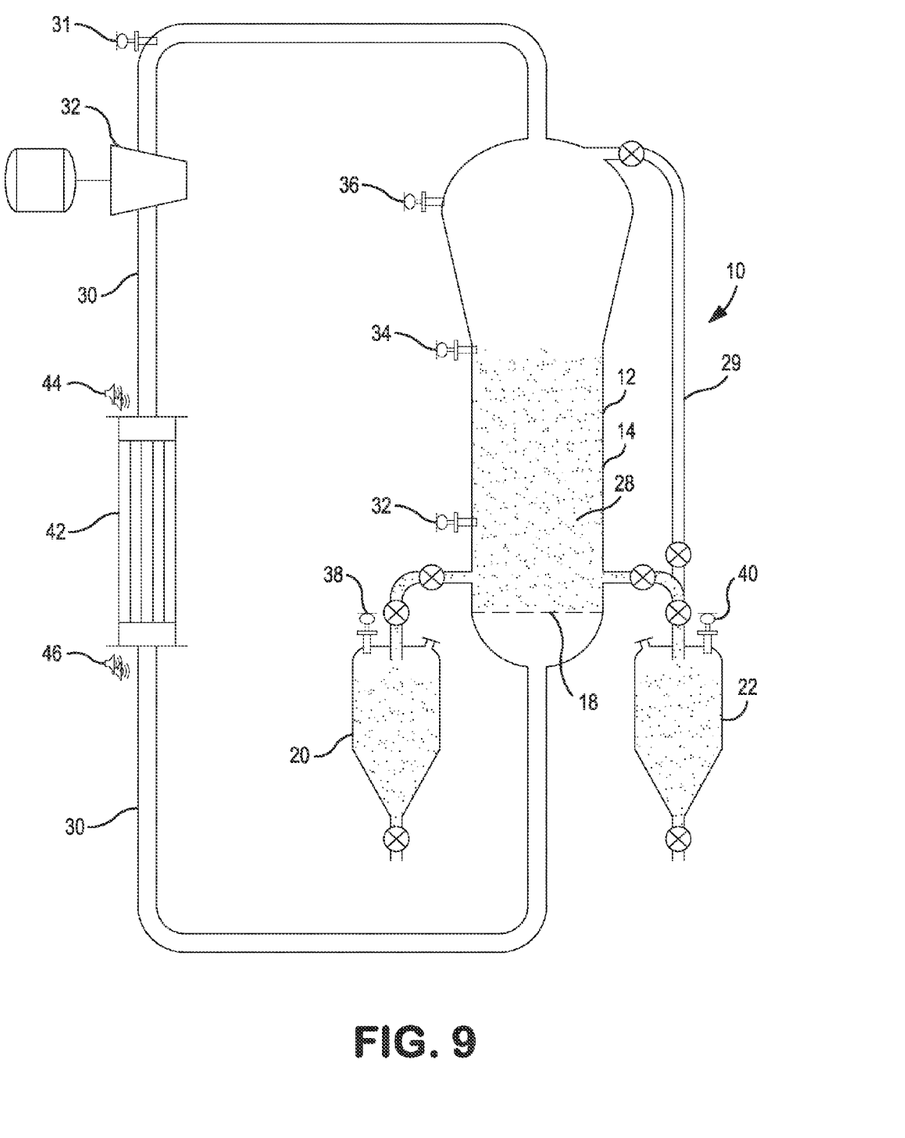
FIG. 9 depicts an embodiment of a conventional gas-phase fluidized-bed reactor system.
Figure 10:
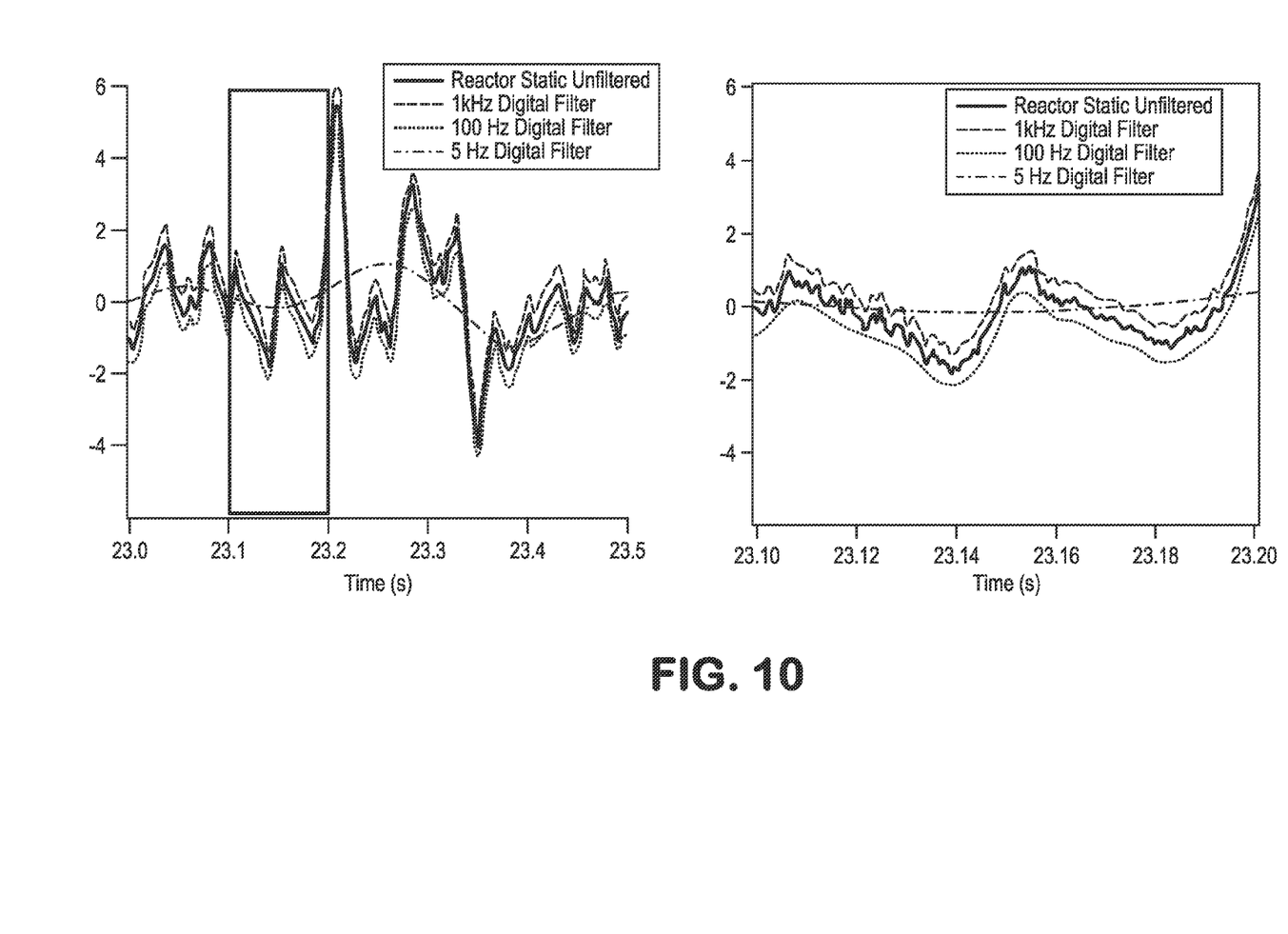
FIG. 10 is a double-plot in which the plot of FIG. 1 is split into components.

Conventional Gas-Phase Fluid Bed Reactor:

FIG. 9 depicts an embodiment of a conventional gas-phase fluidized-bed reactor system 10. System 10 has a gas-phase reactor 12 employing a recycle stream 30 for unreacted gas and solids. Reactor 12 typically has a bed 14, an expanded section 16, a distributor plate 18, a first product chamber 20, a second product chamber 22, and product conduits 24 and 26 for conveying product to chambers 20 and 22, and an enhanced fill line 29. The enhanced fill line is defined any part of the product discharge system that is used to permit unreacted gas and fine particles to return to the reactor system. During operation, reactor 12 contains a solid phase 28, typically a catalyst. A reactant gas (not shown) is passed through distributor plate 18 through solid phase 28 in bed 14 and out of expanded section 16 into recycle stream 30. Recycle stream 30 has a compressor 32 and a heat exchanger 34 (such as a cooler) therealong for pressurization, transport, and temperature modification of the reactant gas prior to return to reactor 12. Enhanced fill line 29 permits gas (and tiny particles entrained therein) to be recycled from product chamber 22 to the top of reactor 12. In another embodiment, a second, analogous enhanced fill line (not shown) could be employed between product chamber 20 and the top of reactor 12. System 10 has static probes 31, 32, 34, 36, 38, and 40 positioned into reactor 12 approximately at bed 12, the upper region of bed 12, expanded section 36, product chamber 20, and product chamber 22, respectively. System 10 has acoustic probes 38 and 40 positioned within the inlet and outlet, respectively, of heat exchanger 34. Precise placement, number and types of these probes can vary from reactor to reactor.

Fluidized-bed reactor systems are disclosed by way of example in EP0784637 B2; EP0970970 B1; EP1623999 A1; EP2263993 A2; U.S. Pat. No. 6,660,812 B2; WO2005/113615 A2; and WO2002/06188 A2, all of which are incorporated herein by reference in their entireties.

In the method of the present disclosure a signal is received from a probe in contact with the interior of the reactor or a process component in communication with the reactor. The signal can be measured by a variety of measurement techniques and equipment, including amplifiers, filters, analog-to-digital converters, oscilloscopes, and or a computer. After the signal from the probe is received, the signal is modified, processed, or analyzed by mathematical processing or signal analysis techniques. This processing can be done in real-time using a computer system or specialized hardware. The processing can also be done as a post-analysis step resulting in a time-lag between measurement and human ability to react.

The processed result is derived, i.e., promulgated in response to, a physical property or condition within the reactor or a process component thereof, e.g., a recycle line or heat exchanger. Physical properties or conditions include fluctuating electric field, sign of passing individual charged particles, presence of transient surface active species, bubbles in charged fluid beds, bubble size, bubble transit time, particle flux, gas velocity, and or mass flow. After the signal has been modified, one or more operating parameters of the reactor are adjusted if the value for the physical property or condition is different than a desired or predetermined value. The desired or predetermined value may be a constant or may be variable-dependent or an algorithm or operator input.

The following are examples of the present disclosure, and are not to be construed as limiting.

Examples

In the present examples, mathematical techniques have been applied to a specific fluidized bed, gas phase, polymerization reactor system. This reactor is equipped with multiple static and acoustic probes. Some of the static probes are commercially available bare-metal probes. Other static probes have been intentionally surface modified through the application of a dielectric coating.

By way of example, a typical fluidized bed, gas phase polyethylene reactor operates at approximately 300 psig and 85 degrees C. with a feed gas composition dependent upon the desired product but largely composed of ethylene. Important components of the reactor system include the main reactor vessel, the fluidized bed, a distributor plate at the bottom of the bed, a disengagement zone above the bed, a recycle gas system, a compressor, a heat exchanger, and a product discharge system. Static probes are available, for example, from Progression, Inc, and are described in U.S. Pat. Nos. 6,008,662 and 6,905,654, which are incorporated herein by reference. Acoustic probes are available, for example, from vendors such as Process Analysis and Automation, LTD. These vendors provide proprietary hardware and software for measuring their probe signals.

Processing Techniques and Interpretations

Fourier Analysis and Digital Filtering of Raw Fast Data from Static Probes

Fourier analysis is a typical mathematical technique for isolating frequency components of a waveform, making it easier to manipulate the base components of the waveform. Equation 1 is a summation form of a Fourier analysis technique that takes into account the imaginary components of the waveform.

$$s_P(t) = \sum_{k=-\infty}^{\infty} S[k] \cdot e^{i 2\pi \frac{k}{P} t} \tag{1}$$

The variables are defined as follows:
$S_P(t)$: a periodic function wherein t is time
P: the period of periodic function $S_P(t)$
$S[k]$: where k is frequency This Fourier analysis technique converts an amplitude versus time spectrum to an amplitude versus frequency spectrum, which can then be modified using a digital filter. In this instance, the digital filter is another waveform with a sharp transition to zero at the maximum frequency that is desired. Once the filter has been applied, the inverse Fourier transform is applied and the frequency components outside of the filter no longer exist.

Data was collected at a rate that is comparable to the timescale of particle-probe interactions in the reactor. Examples of particle-probe interactions are current induction due to particles passing by the probe tip and charge transfer due to particle impacts. For purposes herein, we refer to this signal simply as a "static signal." Based on gas velocity and material properties of the particles and probes, the timescale of a particle-probe interaction is 10 msec or 100 Hz. In current industry practice, data from static probes is collected at 100 Hz or less, with a low-pass filter roll-off of 5 to 20 Hz. Frequencies above the roll-off value are sharply attenuated.

Figure 1:
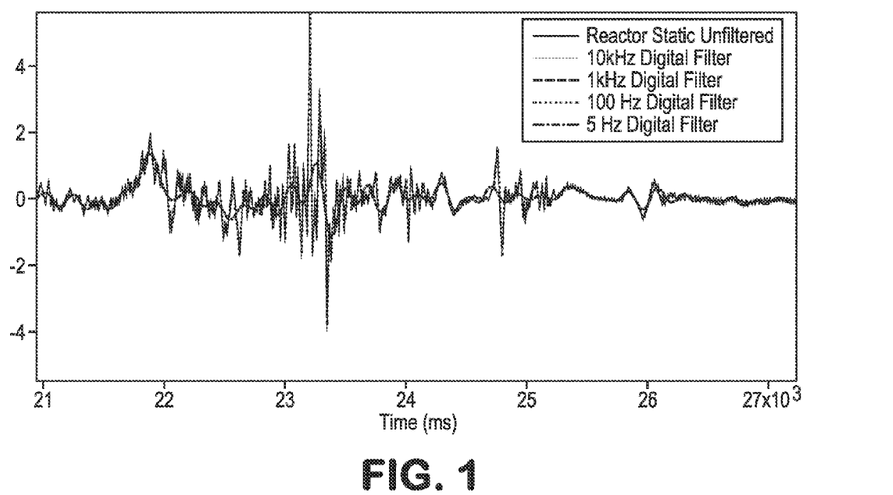
FIG. 1 is a plot of static probe filtered frequency data from the reactor or lower bed.

Data with a 5 to 20 Hz roll-off is too slow to see particle-probe interactions as displayed in FIG. 1. Fast data was taken directly from the probes at 100 kHz and analyzed using Fourier analysis (Equation 1) and digital filtering. The analysis shows that for most of the static probes, if the data acquisition rate is at least 100 Hz, particle-probe interactions are visible. The 100 Hz filtered data in FIG. 1 clearly follows the short time scale bipolar transitions contained within the traces sampled at faster rates of 1 kHz and 10 kHz. These short time-scale transitions are individual positive and negative amplitude fluctuations, which are interpreted as either particle impacts or the charge of particles passing by the probe. The 5 Hz trace does not follow the short time scale fluctuations which are characteristic of these phenomena. The 5 Hz trace exhibits roll-off, which limits the amplitude and resolution, therefore making it unreliable for measuring particle impacts or the charge of particles passing by the probe.

Another type of event that has been shown to occur in the reactor and can be analyzed using these same methods on the static probe data is electrostatic discharges. Electrostatic discharges occur on a timescale of hundreds of nanoseconds requiring data acquisition rates on the order of MHz or GHz. In this case, the static probe is used more as an antenna to detect radio-frequency discharge events within the reactor.

Product Chamber Static Integration

Figure 2:
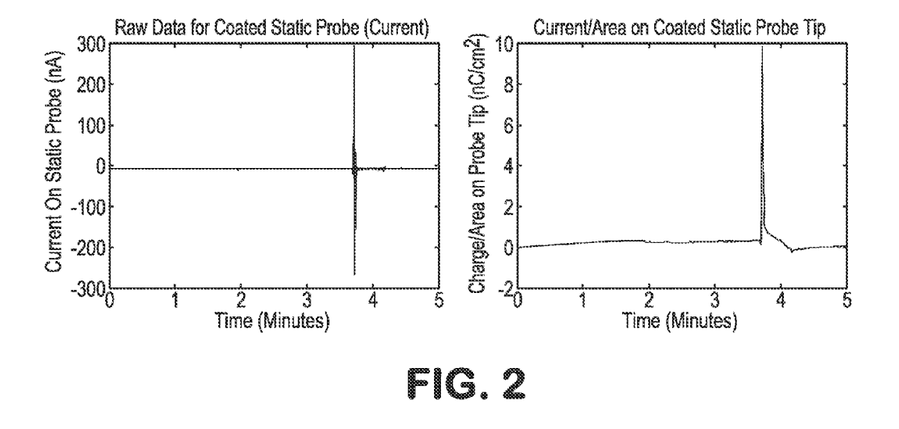
FIG. 2 is a plot of raw current data from the coated product chamber static probe (left) and acquisition rate and surface area compensated integral or charge (right).

A set of probes, referred to as the product chamber static probes are located outside of the main reactor vessel in the product chambers. Approximately one ton of the product is discharged to the chambers in one product discharge event. The product discharge event is easily seen in the data in both plots in FIG. 2 as an amplitude change occurring between 3 and 4 minutes on these plots.

The static probe is located at the top of the product chamber near the opening where the particles are discharged into the chamber. The uncoated static probe measures current induced on a sensing tip due to charged particles passing by and is also susceptible to triboelectric charge transfer from particle impacts with the probe. In order to minimize spurious signal arising from triboelectric charge transfer due to particle impacts, the product discharge chamber probes can be coated with a dielectric coating of polyethylene to mitigate tribocharging. In this case, the induced probe current due to the changing electric field generated by the charged particles entering the chamber can be measured and the charge in the chamber calculated. The measured current from the static probes has units of amps. As Equation 2 indicates, the integral of current over a definite time yields the charge, $$Q = \int_{t_i}^{t_f} I dt \quad (2)$$

wherein I=current in Amps, t is time in seconds, and Q=charge in Coulombs.

The electric field due to the resin in the reactor is related to the charge on the resin assuming the charge density in the reactor is uniform. The general equation for determining electric field is set forth below as Equation 3:

$$E = \frac{1}{4\pi\varepsilon} \int \frac{\rho}{r^2} \hat{r} dV \quad (3)$$

The variables are defined as follows:
E: Electric field
V: volume within reactor
∈: permittivity of material within volume (can be approximated as ∈$_o$ for gas environment)
ρ: charge density
r: distance from center of charge density The specific equation for determining the radial electric field within a cylindrical reactor, and uniform charge distribution, is given below as Equation 4 (variables similarly defined as in 3 above):

$$E(r) = \frac{\rho r}{2\varepsilon} \quad (4)$$

Electric field arising from the charged resin indicates the overall charge state of the reactor. The long period charge signal from the product chamber has been shown to be inversely correlated to the amount of "co-feed" or antistatic that is added to the reactor.

Monitoring of the average DC baseline value can also provide an indication of the average triboelectric charge transfer to the probe, which can also prove useful in detecting particle type changes, or probe coating changes.

Time-Resolved Means of Recycle Line Static and Acoustic Probe Signals

The long-term mean is calculated using Equation 4 wherein "n" is small but is repeated for many iterations.

$$\bar{x} = \frac{1}{n} \cdot \sum_{i=1}^{n} x_i \quad (4)$$

Variables defined as:
x̄: mean of a set of values
x: set of values
n: length of set x
i: iterator Recycle Line Static:

Static probes are susceptible to charge transfer due to particle collisions. The mean signal is the DC signal and is an indication of the charge transfer from particles to the probe, therefore the mean signal is interpreted as particle flux. The mean can also give additional qualitative information. The sign of charge transfer is dependent on the materials that collide and the environment in which they collide. In this example, the charge transferred between the static probe and the particles is a net negative as seen by the probe.

Figure 3:
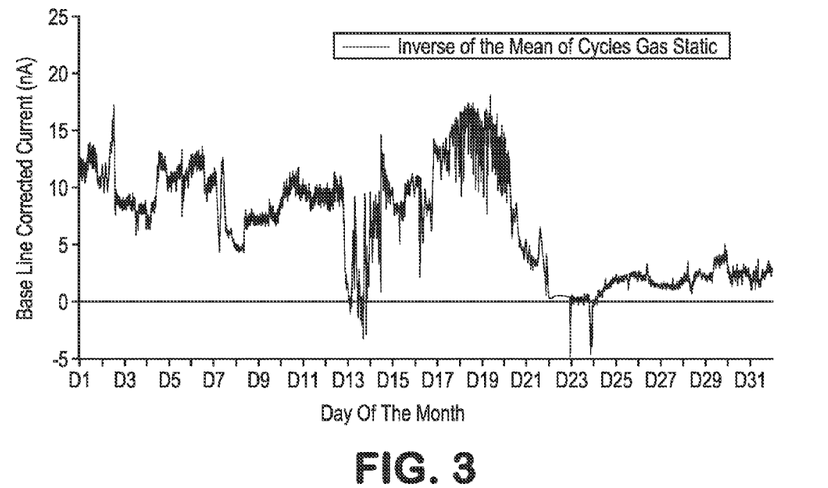
FIG. 3 is a plot of the inverse of the cycle gas or recycle line static mean.

FIG. 3 is a plot of the inverse of the recycle line static probe mean over a period of one month. The inverse of the mean is plotted in FIG. 3 to aid interpretation. The black line in the plot is the base line, and when the mean signal has a sharp transition toward the baseline (opposite of normal activity, often crossing over the base line), it is interpreted as due to a poison in the reactor. This interpretation has been shown experimentally through multiple poison events in a reactor as displayed in Table 1 below.

TABLE 1

| Date | Confirmed w/ Data |
|---|---|
| Sep. 11, 2011 | Yes |
| May 6, 2011 | Yes |
| Jan. 3, 2011 | Yes |
| Nov. 29, 2010 | Yes |
| Feb. 24, 2010 | Yes |
| Oct. 14, 2009 | Yes |
| Total | 100% |

A bare metal static probe, in the presence of contaminants, can experience multiple physical processes, each of which results in unique signatures in probe response. Contaminant species adsorbed by the colliding materials can change the sign of the triboelectric charge transfer.

In the case of contaminants that act as catalyst poisons, the inhibited polymerization productivity leads to an increase in the carryover of particles from the bed. This is dominated by smaller particles. If the bed is experiencing bipolar charging, these additional particles could become positively charged, resulting in a change in sign of the probe response. In the case of contaminant species that cause additional particles to stick to the probe tip, the probe response may show an increase in unipolar charge of the opposite sign.

To identify the dominant mechanism leading to the apparent change in static probe signal we must analyze fast data (≥1 kHz, fast enough to see individual particles) to extract the net polarity of particles interacting with the probe during normal operations and during a poison event in the reactor.

To improve the detection of poison events in the reactor, an algorithm taking into account calculated parameters can be created. Parameters of this algorithm can include the following: static probe current mean (the dc signal due to tribocharging) derivative of static probe mean, acoustic probe sound intensity mean derivative of acoustic probe mean, cycle gas velocity, catalyst grade (specifically transitions), production rate, reactor pressure, deviation from reactor set temperature, and catalyst feed rate.

Acoustic Probes

Acoustic probes measure the energy transferred from particles colliding with the reactor walls and plumbing. The mean of the acoustic probe signals in the recycle line is indicative of mass flow. Two acoustic probes can be employed, for example, to demonstrate feasibility.

Combined Approach

When the mean averages of the recycle line probe signals, static and acoustic, are inspected together, they reveal or confirm even more information the current charge state of the particles. The current charge state can be characterized according to the four following scenarios:

Scenario #1: Acoustic probe means are changing (increase or decrease) and the static probe means remains constant.
Combined Interpretation: Charge state of the particles is changing.
Scenario #2: Acoustic probe means remain constant and the static probe means are changing (increasing or decreasing).
Combined Interpretation: Charge static of the particles is changing
Scenario #3: All probe means are changing.
Combined Interpretation: Mass flow is changing but relative charge state is not.
Scenario #4: All probe means remain constant
Combined Interpretation: Mass flow and relative charge state remain constant.

Time-Resolved Variances of Main Vessel and Recycle Line Static and Acoustic Probe Signals The variance is calculated using Equation 4, wherein, "n" is small and repeated for many iterations.

$$\mathrm{var} = \frac{1}{n}\sum_{i=1}^{n}(x_i - \bar{x})^2 \qquad (4)$$

Variables defined as:
var=variance
x: set of values
$\bar{x}$: mean of set x
n: length of set x
i: iterator Main Vessel Static Probes The time resolved variance of the static probes is the moving or fluctuating portion of the signal from the static probes. This fluctuating signal is associated with the induced charge from a changing electric field due to charged particles or bubbles passing the sensing tip.

Figure 4:
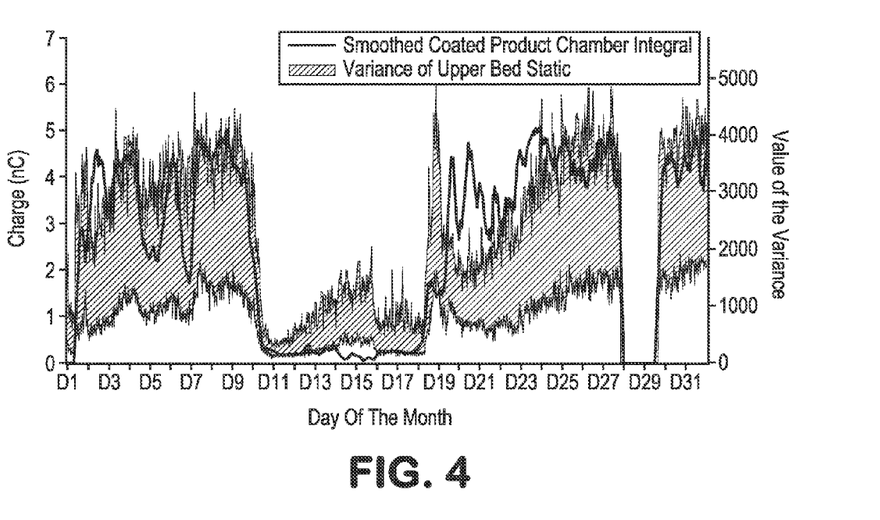
FIG. 4 is month long plot of the variance of the upper bed static vs. the charge calculated from the product chamber discharge integral.
Figure 5:
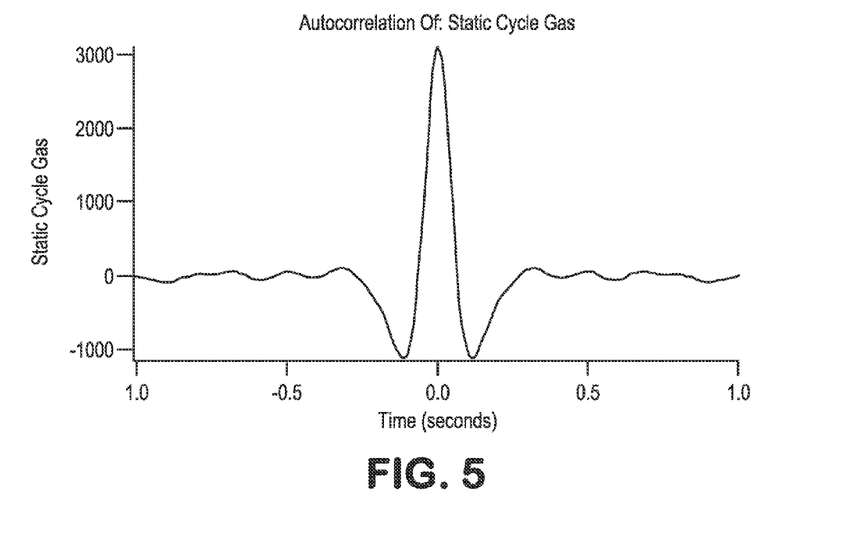
FIG. 5 is a plot of the center of the autocorrelation of the recycle line static probe signal.

The variance of the main vessel static probes correlates well with the electric field interpreted from the product chamber static integration as shown in FIG. 4. The variance of the main vessel static probes can then be interpreted as an unscaled version of the bulk electric field in the resin bed.

Recycle Line Static

The variance of the recycle line static can be generally interpreted as the fluctuation in flow rate of charge particles and has many variables associated with its meaning. The fluctuations in flow rate are caused by variables such as changes in gas flow velocity and turbulence, particle flux, and particle charge.

Acoustic Probes

The variance of the acoustic probes is interpreted as the particle flux and average momentum transfer from particles hitting the recycle line cooler.

Autocorrelation of Recycle Line Static

The Autocorrelation of a signal (Equation 5) is a mathematical tool used for finding periodic signals inside of a single structure, similar to Fourier analysis.

$$\hat{R}(k) = \frac{1}{(n-k)\sigma^2}\sum_{t=1}^{n-k}(X_t - \mu)(X_{t+k} - \mu) \qquad (5)$$

The variables are defined as:
$\hat{R}$: Autocorrelation function
X: any discrete process
n: length of discrete process X
k: and positive integer less than n
$\mu$: true mean
$\sigma^2$: variance
t: iterator The autocorrelation of the recycle line static yields the same macroscopic information as the variance but offers more information on a microscopic scale. The long term peak value of the autocorrelation is what is similar to the variance but the bipolar nature of the autocorrelation indicates that the signal is derived from particles that pass by the probe tip.

Peak of the Cross-Correlation of Acoustic Probes

Figure 6:
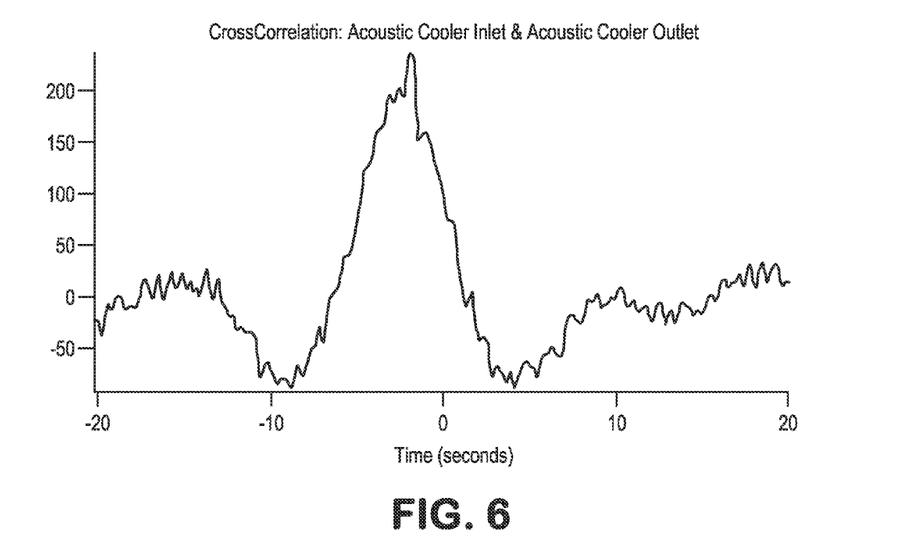
FIG. 6 is a plot of the center of the cross-correlation of the cooler inlet and outlet acoustic probes.

The cross-correlation is a measure of the similarity of two signals throughout time. Equation 6 is the summation form of the cross-correlation algorithm.

$$(f*g)[n] \overset{\text{def}}{=} \sum_{m=-\infty}^{\infty} f^*[m]g[n+m] \qquad (6)$$

for g: any waveform
f*: complex conjugate of f
n: shifts function g
m: iterative value or counter The location of the peak of the cross-correlation of the acoustic probes yields the transit time of the particles through the recycle line cooler. The peak in FIG. 6 is located to the left or negative side of the center of the cross-correlation. This indicates that the features of the signal from the cooler inlet acoustic occur before the features of the cooler outlet acoustic signal and that they are strongly correlated at that point. The interpretation is that the same particles that transfer energy to the cooler inlet acoustic probe transfer energy to the cooler outlet acoustic probe 2 seconds later. Hence the transit time of particles through the cooler is 2 seconds.

Cross-Correlation of Recycle Line Static with Acoustic Probes

Figure 7:
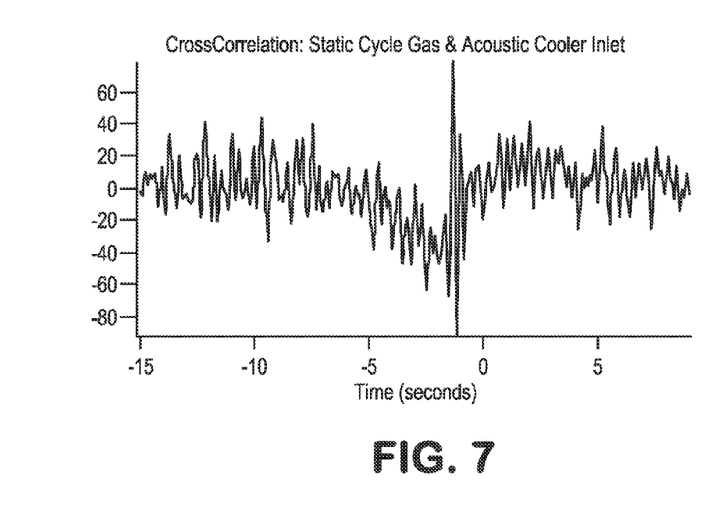
FIG. 7 is a plot of the cross-correlation of the recycle line static signal with the cooler inlet acoustic signal.

The peak of the cross-correlation of the recycle line static with the acoustic probes yields the transit time of particles in the recycle line. The cross-correlation between the recycle line static and the cooler inlet acoustic (FIG. 7) yields the recycle line gas velocity assuming the linear distance between the two probes is known. The tail of the cross-correlations indicates that not all of the entrained particles travel at the cycle gas velocity. The term "tail" is meant to indicate those relatively few particles that are correlated at a later time from the main population of particles.

Figure 8:
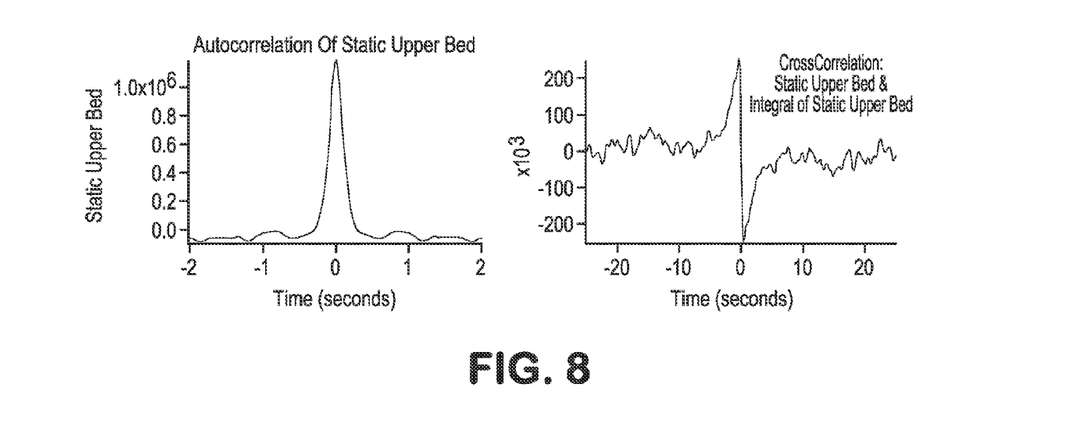
FIG. 8 is a plot of the autocorrelation of the upper bed static probe signal (left) and the cross-correlation of the upper bed static signal with its integral (right).

Autocorrelation of Main Vessel Static Probes and Cross-Correlation of Main Vessel Raw Static with their Integrals The two processing schemes, as shown in FIG. 8, indicate the movement of bubbles in the bed. The peak of the autocorrelation yields the size of the bubbles or the distance from the probe to the bubble. The offset of the two poles of the cross-correlation of main vessel static with its integral indicates the transit time of the bubbles.

Correlation of Product Chamber Static Integration with Short Term Peak Finding in Recycle Line Acoustic and Static Sensors Fluidized bed reactors with modified product discharge systems can have a greater distributor plate fouling rate than other reactors of similar size and production rate. The increased plate fouling is due to the modified product discharge system's fill-line return to the top of the reactor. The modified fill-line allows for pressure equalization of the product chamber resulting in better fill rates of the product discharge tanks Particles are then entrained in the gas and carried up the modified fill-line and potentially entrained into the recycle line. These entrained particles can potentially where they end up at the distributor plate where they get stuck but continue to polymerize causing them to grow and foul the distributor plate. Any increased entrainment of particles is potentially detectable on a static probe installed into the cycle gas line. However, in practice it is very difficult to see a change in the raw static probe signal on a short timescale because the variance of the data is three orders of magnitude larger than the mean.

Product discharge events can be used as time reference points for other analyses. For example, the front point of inflection of the peak of the integral of the product discharge static probe current signal indicates the beginning of a discharge to the product chamber. Using this as the starting point to look for increases in the short period mean value of the recycle line static and acoustic probes will determine if extra particles are entrained in the recycle line due to operation of the improved product discharge system (IPDS) or enhanced fill line. The enhanced fill line permits gas (and tiny entrained particles) to be recycled from the product chamber to the top of the reactor.

The short period mean averages (of the recycle line static and acoustic probe signals) indicate that approximately 20 percent more particles are detected by the probes roughly 30 seconds after a product discharge event.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for operating a gas-phase, fluidized-bed reactor, comprising:
   (a) receiving a signal from a probe in contact with the interior of the reactor or a process component in communication with the reactor, wherein the signal is derived from a physical property or condition within the reactor or the process component;
   (b) modifying the signal to create a modified signal; and
   (c) adjusting one or more operating parameters of the reactor in response to the modified signal if the physical property or condition is different than a desired value.

2. The method of claim 1, wherein the probe is one or more acoustic probes.

3. The method of claim 1, wherein the probe is one or more static probes.

4. The method of claim 1, wherein the probe is one or more coated static probes.

5. The method of claim 1, wherein the probe is a combination of one or more acoustic probes and one or more static probes.

6. The method of claim 3, wherein the signal from the one or more static probes is derived from a physical property or condition selected from the group consisting of fluctuating or changing electric field, presence of transient surface active species, bubble size, bubble transit time, and sign of passing individual charged particles.

7. The method of claim 2, wherein the signal from the one or more acoustic probes is derived from a physical property or condition selected from the group consisting of particle flux or impact, gas velocity, mass flow or impact, and solids flow or impact.

8. The method of claim 4, wherein a coating material for the one or more coated static probes is polyethylene.

9. The method of claim 1, wherein the signal is modified by isolating a component of a waveform of the signal.

10. The method of claim 1, wherein the process component is a recycle line.

11. A method for reducing fouling in a distributor plate of a gas-phase, fluidized-bed reactor with a recycle line, comprising:
   (a) receiving a signal from a coated static probe in contact with the interior of the reactor or the recycle line in communication with the reactor, wherein the signal is derived from a physical property or condition within the reactor or the recycle line;
   (b) modifying the signal to create a modified signal; and
   (c) adjusting one or more operating parameters of the reactor in response to the modified signal if the physical property or condition is different than a desired value.

12. A method for operating a gas-phase, fluidized-bed reactor system, comprising: cross-correlating between the signal of one or more acoustic probes and the signal of one or more coated static probes in a recycle line of a reactor to determine velocity and amount of entrained particles.

13. The method of claim 12, wherein the recycle line of the reactor includes an enhanced fill line.

14. The method of claim 12, wherein fluctuations or variations in each of the signal of one or more acoustic probes and the signal of one or more coated static probes are recorded at frequencies up to 1 MHz.

15. The method of claim 12, wherein fluctuations or variations in each of the signal of one or more acoustic probes and the signal of one or more coated static probes are recorded at frequencies up to 100 MHz.

16. The method of claim 12, wherein fluctuations or variations in each of the signal of the one or more acoustic probes and the signal of the one or more coated static probes are filtered at a roll-off frequency of 10 MHz.

17. The method of claim 12, wherein the fluctuations or variations in each of the signal of one or more acoustic probes and the signal of one or more static coated probes are recorded at frequencies up to 1 GHz.

18. A method for operating a gas-phase, fluidized-bed reactor system, comprising: auto-correlating between or determining the difference between the signals of two or more static probes in the reactor system to determine charge state therein.

19. The method of claim 18, wherein the two or more static probes are two or more coated static probes.

20. The method of claim 18, wherein the difference between the signals of the two or more static probes are recorded at frequencies up to 1 MHz.

21. The method of claim 18, wherein the difference between the signals of the two or more static probes are recorded at frequencies up to 100 MHz.

22. The method of claim 18, wherein the difference between the signals of the two or more static probes are filtered at a roll-off frequency of 10 MHz.

23. The method of claim 18, wherein fluctuations or variations in each of the signal of the two or more static probes are recorded at frequencies up to 1 GHz.

24. A method for operating a gas-phase, fluidized-bed reactor system, comprising: auto-correlating between or determining the difference between the signals of two or more static probes in the reactor system to determine the electric field therein.

25. The method of claim 24, wherein the two or more static probes are two or more coated static probes.

26. The method of claim 24, wherein the difference between the signals of the two or more static probes are recorded at frequencies up to 1 MHz.

27. The method of claim 24, wherein the difference between the signals of the two or more static probes are recorded at frequencies up to 100 MHz.

28. The method of claim 24, wherein the difference between the signals of the two or more static probes are filtered at a roll-off frequency of 10 MHz.

29. The method of claim 24, wherein fluctuations or variations in each of the signal of the two or more static probes are recorded at frequencies up to 1 GHz.

30. A method for operating a gas-phase, fluidized-bed reactor system, comprising: using one or more coated static probes to measure charge on a resin in a fluidized-bed of a reactor in the reactor system.

31. The method of claim 30, wherein a signal generated by the one or more static coated probes is integrated to determine and average charge on the resin.

32. The method of claim 30, wherein the signal of the one or more coated static probes are recorded at frequencies up to 1 MHz.

33. The method of claim 30, wherein the signal of the one or more coated static probes are recorded at frequencies up to 100 MHz.

34. The method of claim 30, wherein the signal of the one or more coated static probes is filtered at a roll-off frequency of 10 MHz.

35. The method of claim 30, wherein fluctuations or variations in each of the signal of the one or more coated static probes are recorded at frequencies up to 1 GHz.

36. A method for operating a gas-phase, fluidized-bed reactor system, comprising: measuring direct current from a signal from one or more coated static probes to determine tribocharging components of the signal.

37. The method of claim 36, further comprising determining the average direct current.

38. A method for operating a gas-phase, fluidized-bed reactor system, comprising: cross-correlating between the signal of one or more acoustic probes and the signal of one or more coated static probes in a recycle line of a reactor to determine velocity and amount of entrained particles.

* * * * *